United States Patent [19]
Allen et al.

[11] Patent Number: 5,008,298
[45] Date of Patent: Apr. 16, 1991

[54] EXPANDABLE THERMOPLASTIC RESIN BEADS

[75] Inventors: Richard B. Allen, Pittsfield, Mass.; William E. Gibbs, Chesapeake, Va.; Lynn M. Hans, Pittsfield, Mass.

[73] Assignee: General Electric Co., N.Y.

[21] Appl. No.: 574,703

[22] Filed: Aug. 29, 1990

Related U.S. Application Data

[62] Division of Ser. No. 502,095, Mar. 30, 1990, Pat. No. 4,968,466, which is a division of Ser. No. 384,774, Jul. 24, 1989, Pat. No. 4,920,153, which is a division of Ser. No. 232,900, Aug. 16, 1988, Pat. No. 4,874,796, which is a division of Ser. No. 62,004, Jun. 12, 1987, Pat. No. 4,782,098.

[51] Int. Cl.$^5$ .............................................. C08J 9/22
[52] U.S. Cl. ......................................... 521/139; 264/53; 264/321; 264/544; 264/DIG. 5; 521/56; 521/60; 521/81; 521/180
[58] Field of Search ............... 521/56, 60, 81, 139, 521/180; 264/53, 321, 544, DIG. 5

[56] References Cited

U.S. PATENT DOCUMENTS

| 4,782,098 | 11/1988 | Allen et al. | 521/60 |
| 4,874,796 | 10/1989 | Allen et al. | 521/60 |
| 4,920,153 | 4/1990 | Allen et al. | 521/60 |
| 4,968,466 | 11/1990 | Allen et al. | 521/60 |

*Primary Examiner*—Morton Foelak
*Attorney, Agent, or Firm*—Francis T. Coppa

[57] ABSTRACT

A process for producing expandable thermoplastic resin beads which comprises suspending in an aqueous medium interpolymer beads comprising a polyphenylene ether resin and a polymerized vinyl aromatic monomer such as styrene, polymerizing the vinyl aromatic monomer in the presence of a polymerization catalyst to interpolymerize the vinyl aromatic monomer with the polyphenylene ether and, optionally, adding a crosslinking agent, to form interpolymerized thermoplastic resin beads, and introducing a blowing agent under pressure into the thermoplastic resin beads. The resulting resin beads have excellent foamability and molding fusability, and a foamed shaped article having superior thermal stability can be prepared from these beads.

7 Claims, No Drawings

EXPANDABLE THERMOPLASTIC RESIN BEADS

This is a divisional of application Ser. No. 502,095, filed on Mar. 30, 1990 now U.S. Pat. No. 4,968,466, which is a divisional of application Ser. No. 384,774, filed July 24, 1989 now U.S. Pat. No. 4,920,153, which is a divisional of Ser. No. 232,900, filed on Aug. 16, 1988 now U.S. Pat. No. 4,874,796, which in turn is a division of Ser. No. 062,004, filed on June 12, 1987 now U.S. Pat. No. 4,782,098.

This invention relates to a process for producing expandable thermoplastic resin beads, especially those which have superior foamability and molding fusability and the resulting foamed articles made from such beads provide good thermal stability.

BACKGROUND OF THE INVENTION

Generally, it is easy to obtain polystyrene beads having a high expansion ratio. The resulting foamed articles made from such beads have high rigidity and good shape retention, but have the disadvantage in that they are fragile and have poor chemical resistance, oil resistance and thermal stability. In pre-expanded bead form, polystyrene has a glass transition temperature of, for example, 80°–95° C., precluding its use in automotive foams, for example, under the hood.

Foamed products of polystyrene and styrene-maleic anhydride are known, e.g., from U.S. Pat. No. 4,442,232 and, although they have higher thermal resistance, they are rather difficult to prepare, and have limitations in their impace resistance and compressive strength. Expandable thermoplastic resin beads comprising ethylene-propylene copolymers grafted with vinyl aromatic monomers are also known, e.g., from Kajimura et al., U.S. Pat. No. 4,303,756. The compositions which are produced are said to have excellent thermal stability, but resistance to solvents and oxidation tend to be lower than desirable. To overcome these drawbacks, it has also been proposed to form foams from blends of polyphenylene ethers and polystyrene or high impact, i.e., rubber-modified grafted polystyrene imbibed with liquid blowing agents. Mention can be made of U.S. Pat. No. 3,492,249, which suggests foaming a physical blend of polyphenylene ether and polystyrene. However, to develop maximum strength, the cells have to be elongated and involves a hot-stretching step, which is not desirable. In U.S. Pat. Nos. 4,598,100 and 4,598,101, blends of a polyphenylene ether resin and high impact polystyrene are imbibed at atmospheric pressure with a volatile chlorinated hydrocarbon in an extruder, and the blend is extruded thereafter into a foam; U.S. Pat. Nos. 4,532,263 and 4,598,104, disclose impregnating pellets of a blend of polyphenylene ether and high impact polystyrene, preexpanding the pellets, and then shaping them in an open mold to form foam. The last-mentioned patent also discloses that foamed sheets of blended polyphenylene ether resin an polystyrene can be thermoformed into shaped foamed articles. In all cases, the prior art compositions of the polyphenylene ether resin do not provide ultimate resistance to thermal and physical shocks because they either contain rubber modified polystyrene and they always are merely physical blends of the polymer components. In all cases, the expanded pellets are not of optimum size for molding.

A new method of making expandable particles and foams from polyphenylene ethers has now been discovered. This involves interpolymerization of a vinyl aromatic monomer with a preformed polyphenylene ether resin with the object to make a low density higher temperature resistant expandable bead foam, the beads having a smaller size and more spherical shape than previously obtainable. When, for example, foamable particles are made from a polymerized vinyl monomer, e.g., styrene, containing polyphenylene ether resin, e.g., poly(2,6-dimethyl-1,4-phenylene) ether, the particulate product comprises an interpolymer and thus is different in this respect from the pelletized blends employed in the prior art. The interpolymer has the significant and unexpected ability to increase the glass transition temperature of the preexpanded beads to 104°–117° C., typically, and the high temperature stability of the ultimate foams can be increased to or higher than a previously attainable degree merely by increasing the polyphenylene ether content of the small, sperical particles of interpolymer used to make the foam. Other physical properties are improved, as well, especially, uniform cell structure and foam strength.

SUMMARY OF THE INVENTION

According to the invention, there is provided a process for producing expandable thermoplastic resin beads which comprises suspending in an aqueous medium from 1 to 50 parts, preferably 5 to 40 parts, by weight of a polyphenylene ether resin and 99 to 50 parts, preferably 95 to 60 parts, by weight of a vinyl aromatic monomer per 100 parts by weight of resin and monomer; adding a polymerization catalyst and polymerizing the vinyl monomer to form interpolymerized thermoplastic resin beads and during interpolymerization or subsequently impregnating the interpolymerized thermoplastic resin beads preferably under pressure with an easily volatilizable hydrocarbon or halogenated hydrocarbon blowing agent. The blowing agent can be imbibed during or after formation of the interpolymer, for example, in a pressure vessel or in an extruder. The particles can also be melted, for example, in an extruder and then imbibed.

This invention also provides compositions comprising discrete particles of such interpolymers of a polyphenylene ether resin and a polymerized vinyl aromatic monomer imbibed under pressure with an easily volatilizable hydrocarbon or halogenated hydrocarbon blowing agent, the blowing agent being present in an amount sufficient to foam the interpolymer to a density less than about 20 lbs./ft$^3$.

In another aspect the invention contemplates a process for forming a shaped polymer foam structure comprising:

(a) imbibing particles of such an interpolymer of a polyphenylene ether resin and a polymerized vinyl aromatic monomer under pressure with an easily volatilizable hydrocarbon or halogenated hydrocarbon blowing agent;

(b) heating the imbibed particles to a temperature sufficient to cause expansion of said particles to a density significantly less than that of the imbibed particles; and (c) filling a mold with the expanded particles and subjecting the particles to sufficient heat to fuse the particles together on cooling to form a shaped coherent foam structure.

A further feature of the invention are such interpolymers in foam form having a density of less than about 20 lbs/ft$^3$, wherein said interpolymer is a blowing agent imbibable composition comprising a polyphenylene ether resin and a polymerized vinyl aromatic monomer, wherein said blowing agent is an easily volatilizable hydrocarbon or halogenated hydrocarbon.

DETAILED DESCRIPTION OF THE INVENTION

In the process of this invention, the polyphenylene ether resin is used as a nucleus into which the vinyl aromatic monomer is absorbed and the vinyl aromatic monomer is interpolymerized with the resin in the presence of a polymerization catalyst. The polyphenylene ether resins (also known as polyphenylene oxides) used in the invention are a well known class of polymers which have become very useful commercially as a result of the discovery by Allan S. Hay of an efficient and economical method of production See, for example, U.S. Pat. Nos. 3,306,874 and 3,306,875. Numerous modifications and variations have since been developed but, in general, they are characterized as a class by the presence of arylenoxy structural units. The phenolic end groups can also be capped, by known procedures, such as reaction with ester-forming and ether-forming reagents. The present invention includes all such variations and modifications, including but not limited to those described hereinafter.

The polyphenylene ethers favored for use in the practice of this invention generally contain structural units of the following formula

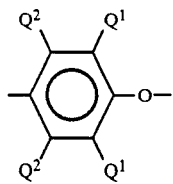
(I)

in which each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylphenyl and the corresponding heptyl groups. Examples of secondary lower alkyl groups are isopropyl, sec-butyl and 3-pentyl. Preferably, any alkyl radicals are straight chain than branched. Most often, each $Q^1$ is alkyl or phenyl, especially $C_{1-4}$ alkyl, and each $Q^2$ is hydrogen.

The preferred polyphenylene ethers comprise units of the formula

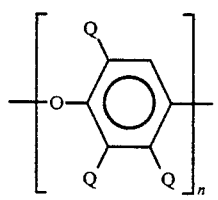

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the atom and the phenyl nucleus, hydroxcarbonoxy radicals, and halohydrocarbonoxy radicals having at least two carbon atoms between the halogen atom and the phenyl nucleus.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafing onto the polyphenylene ether chain such vinyl monomers as acrylonitrile and vinyl aromatic compounds, for example, styrene, and such polymers as polystyrene and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.38 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials. Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine. catalyst preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alphahydroxyoximes (both monomeric and polymeric), o-hydroxyaryl oximes, and beta-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

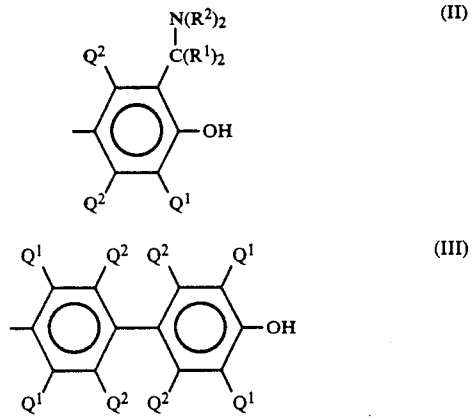

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in compatibilization with other blend components.

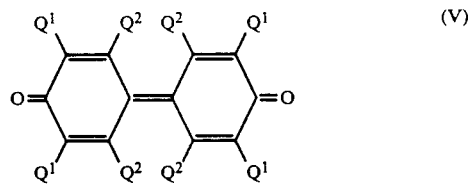

Polymers with bisphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent. In mixtures of this type, the diphenoquinone is ultimately incorporated into the polymer in substantial amounts, chiefly as an end group.

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

In order to cause rapid absorption of the vinyl aromatic monomer, the polyphenylene ether is used in a particulate form. It is preferably in the form of powder or spheres, particles or pellets having a diameter of about 0.2 to 10 mm.

Examples of vinyl aromatic monomers are used in the process of this invention are sytrene, alpha-methylstyrene, ethylstyrene, chlorostyrene, bromostyrene, vinyltoluene, vinylbenzene, and isopropylxylene. These monomers may be used either alone or in admixture. A mixture of at least 50% of the vinyl aromatic monomer and a monomer copolymerizable with it, such as acrylonitrile, methyl methacrylate or methyl acrylate can also be used.

The polymerization catalysts used in the process of this invention include, for example, organic peroxides such as benzoylperoxide, tertiary butyl perbenzoate, lauroyl peroxide, tertiary butyl peroxy-2-ethylhexanate and tertiary butyl peroxide, and azo compounds such as azobisisobutyronitrile and azobisdimethylvaleronitrile.

In the process of this invention, a cross-linking agent is not always necessary but may be added. Examples of such cross-linking agents are di-t-butyl peroxide, t-butyl cumyl peroxide, dicumyl peroxide, alpha, alpha-bis(t-butyl peroxy)p-di-isopropylbenzene, 2,5-dimethyl-2,5-di(t-butyl peroxy) hexyne-3,2,5-dimethyl-2,5-di(benzoyl peroxy)hexane, and t-butyl peroxy isopropyl carbonate. The cross-linking agent is used generally together with a cross-linking promoter. Examples of cross-linking promoters include functional vinyl compounds such as divinylbenzene, polyethylene glycol dimethacrylate, triallyl cyanurate, diallyl phthalate, 1,3-butadiene, 1,2-polybutadiene and 1,4-polybutadiene, quinone dioxime, and bisamide.

The process of this invention is conveniently carried out as follows. First, polyphenylene ether resin (to be referred to as a nuclear resin) is reduced to powder by, for example, precipitation from a reaction mixture. The powder of the nuclear resin is suspended in an aqueous medium containing a dispersing agent. The dispersing agent may be, for example, polyvinyl alcohol, methyl cellulose, calcium phosphate, magnesium pyrophosphate, calcium carbonate, etc. The amount of the dispersing agent employed is 0.01 to 5% by weight based on the amount of water. Then a vinyl aromatic polymerization catalyst is added to the resulting suspension containing the nuclear resin particles dispersed therein. These materials may be added all at one time, or gradually in small portions. The vinyl aromatic monomer and the polymerization catalyst may be added separately. Alternatively, the nuclear resin and the polymerization catalyst may be first dissolved in, or mixed with, the vinyl aromatic monomer and the solution may be used as a solution in a solvent which does not hamper the polymerization reaction. Examples of solvents that can be used for this purpose include toluene, benzene and 1,2-dichloropropane.

In one embodiment of the present invention, the aqueous medium is heated to a temperature at which the vinyl monomer can be polymerized, and then the vinyl aromatic monomer and the polymerization catalyst are added. Alternatively, these materials are added to room temperature, and then the suspension is heated to the polymerization temperature. When the cross-linking agent is used in the process of this invention, it may be used for dissolving in the vinyl aromatic monomer, or in the solvent for the polymerization catalyst. When the vinyl aromatic monomer is used in a relatively large amount, it is desirable to add the vinyl aromatic monomer gradually in small portions to the suspension in order to prevent the formation of a homopolymer of the vinyl aromatic monomer.

The vinyl aromatic monomer added to the suspension penetrates into the dissolved nuclear resin chains and is there polymerized, or polymerized and crosslinked, in the nuclear resin chains. As the result of this reaction, interpolymerization of the vinyl aromatic monomer takes place. In this reaction, 1 to 50, preferably 5 to 40 parts by weight of the nuclear resin and 99 to 50, preferably 95 to 60 parts by weight of the vinyl aromatic monomer are used. When the amount of the vinyl aromatic monomer is smaller than that above-specified, the solution is very viscous and hard to interpolymerize. On the other hand, when the amount of the vinyl aromatic monomer is larger than the upper limit specified, elasticity, thermal stability and oil resistance of the resulting foamed product tend to be deteriorated. Accordingly, the proportions of the polyphenylene ether resin and the vinyl aromatic monomer employed should be in the range of from 1 to 50 parts by weight, preferably from 5 to 40 parts by weight, of the polyphenylene ether resin, and from 99 to 50 parts by weight, preferably from 95 to 60 parts by weight, of the vinyl aromatic monomer, per 100 parts by weight of resin and monomer.

The resulting thermoplastic resin particles consist of a polyphenylene ether resin interpolymerized with a vinyl aromatic homopolymer. Since the above reaction provides thermoplastic resin beads containing the interpolymer, phase separation as seen in many polymer blends does not occur, and, thus, the interpolymer exhibits the effect of increasing compatibility between the polyphenylene ether resin and the vinyl aromatic polymer.

In the process of this invention, for example, a blowing agent is impregnated under pressure in the resulting thermoplastic resin beads in an aqueous suspension. A suspending agent is preferred to be added to the aqueous suspension in order to prevent bonding or coalescing of the thermoplastic resin beads during impregnation with the blowing agent. Examples suspending agents are organic compounds such as polyvinyl alcohol, polyacrylic acid salt, polyvinyl pyrrolidone, carboxymethyl cellulose, calcium stearate and ethylene-bis stearamide, and, sparingly, water-soluble fine powders of inorganic compounds such as calcium pyrophosphate, calcium phosphate, calcium carbonate, magnesium carbonate, magnesium phosphate, magnesium pyrophosphate and magnesium oxide. When an inorganic compound is used as the suspending agent in the process of this invention, it should be desirably used together with a surface active agent such as sodium dodecylbenzenesulfonate.

Easily volatilizable blowing agents are used in the process of this invention. Examples of blowing agents include aliphatic hydrocarbons such as propane, n-butane, i-butane, n-pentane isopentane and n-hexane; cycloaliphatic hydrocarbons such as cyclopentane and cyclohexane; and halogenated hydrocarbons such as methyl chloride, ethyl chloride, dichlorodifluoromethane, chlorodifluoromethane and trichlorofluoromethane. These blowing agents are used in an amount of generally in the range of from 1 to 40, preferably up to 30 parts by weight based on 100 parts by weight of the thermoplastic interpolymer resin beads and blowing agent. A small amount for example, 1 to 5% by weight, of an organic solvent such as toluene or xylene, may be used together therewith.

The impregnation of the blowing agent is performed, for example, by suspending the polymerizable ingredients in water containing the suspending agent in an autoclave, heating the suspension, and introducing the blowing agent, e.g., under pressure, before or after the interpolymer beads are formed. This procedure affords expandable thermoplastic resin beads.

The blowing agent impregnated in the expandable thermoplastic resin beads obtained by the process of this invention does not easily escape from the beads, and the resin beads can be stored in a stable condition over long periods of time. As a result, it is not necessary, to prefoam the beads within 24 hours after preparation, or to store them in a container under pressure. Therefore, the resulting expandable thermoplastic resin beads can be stored or transported as prepared. For example, when the expandable resin particles, in accordance with this invention, are prefoamed with steam after one week storage at atmospheric pressure, foamed beads having a sufficient expansion ratio can be obtained.

A foamed article having a high expansion factor can be prepared by heating the expandable thermoplastic resin beads in accordance with disclosure of this invention, by a heating medium, such as steam.

The expandable thermoplastic resin beads obtained by the process of this invention can be formed into a foamed shaped article of a desired configuration by pre-foaming the beads and fusing them in a mold cavity. The resulting foamed shaped article has superior thermal stability, chemical resistance (e.g., oil resistance) and compressive strength due to the formed interpolymer. In particular, when the foamed article is used as an underlayer of a roofing material to be subject to high temperatures, it is not shrunk nor softened by heat, and, therefore, it finds extensive use as a heat or sound insulating material or a cushioning material.

In one way of carrying out the process of this invention, the blowing agent is impregnated after the thermoplastic resin beads have been prepared. It is not necessary to use a high pressure reactor for polymerization and, optionally, crosslinking, and polymer beads can be very easily obtained. According to the process of this invention, therefore, thermoplastic resin beads can be obtained prior to the impregnation of the blowing agent by polymerizing the vinyl aromatic monomer with the nuclear resin in the presence of a polymerization catalyst and, optionally, a cross-linking agent to induce interpolymerization or both interpolymerization and cross-linking. These resin beads can be formed into expandable thermoplastic resin beads in the manner described hereinabove. These resin beads can also be used as a resin for extrusion shaping. For example, it is possible to feed these beads into an extruder, force a blowing agent into it, and extrude a foamed sheet, board or rod.

Furthermore, according to the process of this invention, it is possible to add a fire retarding agent, a coloring agent, an antistatic agent, etc.

DESCRIPTION OF THE PREFERRED EMBODIMENTS

The following Examples illustrate the present invention. Unless otherwise specified, all parts and percentages are by weight.

EXAMPLE 1

Beads of poly(2,6-dimethyl-1,4-phenylene ether) (PPO ®)/styrene interpolymer were produced via suspension polymerization conducted in the following manner. One hundred grams of deionized water was added to a three neck glass reaction vessel equipped with a thermometer, condenser, nitrogen purge and mechanical stirrer. Throughout, the reaction the vessel was constantly stirred at 800-1000 rpms and all solutions were kept under nitrogen. To the reaction vessel 73 grams of a solution of 20 parts or poly(2,6-dimethyl-1,4-phenylene)ether PPO dissolved in 80 parts of styrene monomer was added followed by 54 grams of 0.3% polyvinyl alcohol aqueous solution. After 30 minutes, azobisisobutylnitrile (AIBN) (1.0 g) dissolved in acetone and 16 grams of pentane were added. The temperature of the vessel was heated to 75° C. for 15-18 hours following distillation of the acetone.

The reaction mixture was cooled, filtered, and the resultant granules were washed several times with deionized water then air dried overnight. The granules had a diameter of predominantly less than 1.5 mm by optical microscopy and had a glass transition temperature after pre-expansion of 117° C. by differential scanning calorimetry. Bulk density of the pre-expanded material (40 psi for 30 seconds) was approximately 2.25 lbs./ft.$^3$.

EXAMPLE 2

The suspension polymerization was carried out in the same fashion as Example 1, with a few minor changes. The three neck glass reaction vessel equipped with a thermometer and stirrer was purged for 15 minutes before the addition of 100 grams of deionized water and 50 grams of 0.3% polyvinyl alcohol aqueous solution. After an hour 80 grams of 20/80 PPO ®/styrene monomer and 1.0 g AIBN and 16 g of pentane were slowly added to the reaction vessel. After an additional hour of purging, the vessel was heated to 75°-80° C. for 17-18 hours.

The reaction mixture was allowed to cool and spherical beads were collected by filtration and washed with deionized water then air dried overnight. The beads had a diameter of primarily 1.5-2.0 mm via optical microscopy and a glass transition temperature of 104° C. by means of differential scanning calorimetry. Bulk density of the pre-expanded material (40 psi for 30 seconds) was roughly 10.5 lbs./ft.$^3$.

EXAMPLE 3

The pre-expanded imbibed particles of Example 1 can be formed into a foam structure as follows: The pre-expanded particles are loaded into a mold of a suitable size, typically, 12×12×0.5 inches. Steam is introduced into the mold at a pressure of 60 psi. The confined expanded pellets assume the shape of the mold. Their final density is less than 5 lbs./ft.$^3$. The foamed shape has excellent physical, thermally resistant, solvent-resistant and oxidation-resistant properties.

EXAMPLE 4

The particles of Example 1 are extruded at 450° F. through a circular slit die to yield a sheet of about 90 mils thickness, density about 2.5 lbs./ft.$^3$, closed cell structure. The foam sheet can be preheated to a temperature of about 475°-525° F. and incrementally advanced to male and female dies which will conform the resin sheet into a plurality of semi-circular sheaths of two of which may accommodate the insulation of a conduit having an outside diameter of about 1 inch. After the structures are thermoformed in the foam sheet, the molds are cooled, the thermoformed sheet removed and the impressed structures are separated from the selvage of the sheet.

The above-mentioned patents are incorporated by reference.

While the invention has been described in detail and with reference to specific embodiments thereof, it will be apparent to one skilled in the art that various changes and modifications can be made therein without departing from the spirit and scope thereof. For example, instead of poly(2,6-dimethyl-1,4-phenylene ether) there can be used poly(2,6-dimethyl-co-2,3,6-trimethyl-1,4-phenylene ether). A polyphenylene ether resin capped with an ester or an ether group can be used, see, e.g., Holoch et al., U.S. Pat. No. 3,375,228, and Hay and White, U.S. Pat. No. 4,048,143, both incorporated herein by reference. Instead of styrene monomer, there can be used alpha-methyl styrene, bromostyrene, chlorostyrene, vinyltoluene, mixtures of any of the foregoing and the like. Instead of interpolymerizing with the catalyst, preformed interpolymer particles can be suspended in water and imbibed with the blowing agent. The interpolymer beads can be imbibed by dipping the beads into the liquid blowing agent. Instead of pentane, the blowing agent can comprise n-butane, methyl chloride, dichlorodifluoromethane, chlorodifluoromethane, trichlorofluoromethane, mixtures thereof, and the like. All such obvious variations are within the full intended scope of the appended claims.

We claim:

1. A thermoformed structure of an interpolymer of from 1 to 50 parts of a polyphenylene ether resin and from 99 to 50 parts of a polymerized vinyl aromatic monomer per 100 parts of resin and monomer foam prepared by the method which comprises:
   (a) subjecting a sheet of said foam having a density of less than 20 lbs./ft.$^3$ to a first temperature sufficient to permit a shaped formation to be effected therein;
   (b) effecting a shape in said sheet while at said temperature; and
   (c) reducing the temperature of said sheet to a second temperature permitting permanent retention of said shape in said sheet at or below said second temperature.

2. A thermoformed structure as defined in claim 1 wherein said interpolymer comprises poly(2,6-dimethyl-1,4-phenylene)ether resin in polymerized styrene monomer.

3. The thermoformed structure of claim 1 wherein the interpolymer comprises poly(2,6-dimethyl-co-2,3,6-trimethyl-1,4-phenylene ether) resin in polymerized styrene monomer.

4. The thermoformed structure of claim 1 wherein the interpolymer comprises a copolymer resin containing 2,6-dimethyl-1,4-phenylene ether units and 2,3,6-trimethyl-1,4-phenylene ether units, in polymerized styrene monomer.

5. The thermoformed structure of claim 1 wherein the polyphenylene ether resin in the interpolymer is one which has been capped with an ester group or an ether group.

6. The thermoformed structure of claim 1 wherein the vinyl aromatic monomer is selected from the group consisting of styrene, alpha-methylstyrene, ethylstyrene, chlorostyrene, bromostyrene, vinyltoluene, vinylbenzene, isopropylxylene, and mixtures of any of these monomers.

7. The thermoformed structure of claim 6 wherein the monomer mixture comprises 50% of the vinyl aromatic monomer, and at least one second monomer selected from the group consisting of acrylonitrile, methyl methacrylate, and methyl acrylate.

* * * * *